Feb. 16, 1954　　M. DE LAGREVOL ET AL　　2,669,311
AUTOMATIC SCREW PITCH CHANGE AND LOCKING DEVICE
Filed Nov. 25, 1950

INVENTORS
MAXIME DE LAGREVOL
ROGER LABOUREIX
BY
ATTORNEY

Feb. 16, 1954　　　M. DE LAGREVOL ET AL　　　2,669,311
AUTOMATIC SCREW PITCH CHANGE AND LOCKING DEVICE
Filed Nov. 25, 1950　　　　　　　　　　　　　　3 Sheets-Sheet 2
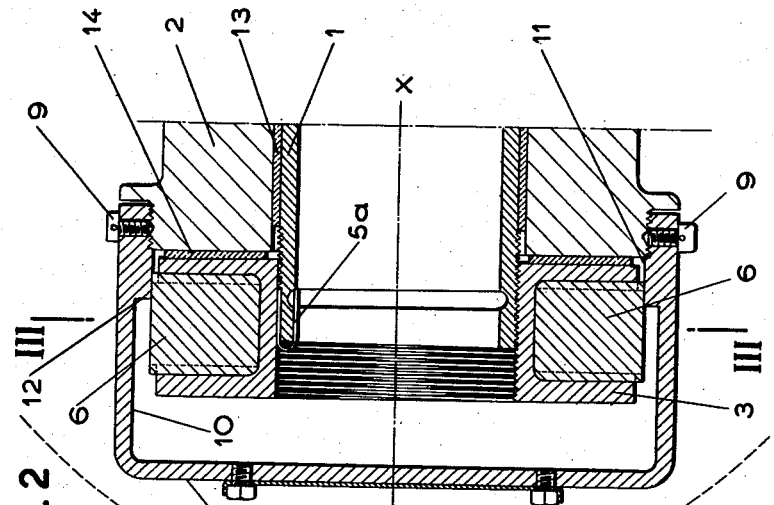
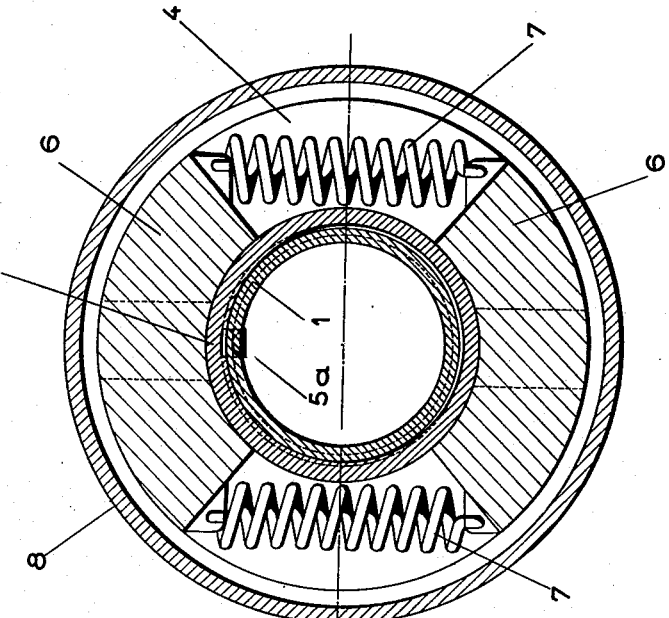
INVENTORS
MAXIME DE LAGREVOL
ROGER LABOUREIX
BY *Albert Jacobs*
ATTORNEY Feb. 16, 1954  M. DE LAGREVOL ET AL  2,669,311
AUTOMATIC SCREW PITCH CHANGE AND LOCKING DEVICE
Filed Nov. 25, 1950  3 Sheets-Sheet 3

Inventors:
Maxime de Lagrevol
Roger Laboureix
by Albert F. Jacobs
ATTY.

Patented Feb. 16, 1954

2,669,311

UNITED STATES PATENT OFFICE 2,669,311

AUTOMATIC SCREW PITCH CHANGE AND LOCKING DEVICE

Maxime de Lagrevol, Paris, and Roger Laboureix, Neuilly-sur-Seine, France

Application November 25, 1950, Serial No. 197,571

Claims priority, application France November 29, 1949

6 Claims. (Cl. 170—160.16)

This invention relates to an improved variable-pitch propeller provided with automatic blade locking means in which a resilient member tending to impart a low pitch to the propeller blades is counterbalanced by centrifugal force acting on counter-weights, rotating therewith, in order to maintain the steadiest R. P. M. of the associated power-unit; the locking of the propeller blades being insured, within predetermined service limits of said power-unit, by automatic blade-locking means operated by the rotation of the propeller-shaft, or the relative speed of the air or the variation of the engine-torque.

According to our invention we provide an automatic screw pitch change and locking device comprising a sleeve, coaxial to the screw hub, forwardly urged by a resilient member and adapted for axial sliding movement between two thrust blocks and connecting rods each having its ends linked respectively to said sleeve and to a device secured to a blade root having a counter-weight, said automatic device being so characterized with respect to the arrangement of said connecting rods and the links thereof, whereby the resilient return torque towards the lower pitches is substantially constant or is even reduced when the counter-weights direct the screw blades toward their higher pitches.

This result may be obtained by so disposing the connecting rod that either the axis of its link with the device secured to the blade root comes in a rearward relationship with the plane through the orientation axes of the blades or the axis of said connecting rod intersects the rotational axis forwardly of the screw at an angle less than 90°, or both.

The invention further provides a variable-pitch screw having automatic blade locking means within predetermined service limits of the power-unit, plural counter-weight means, in combination with the aforementioned sleeve, adapted to slide radially relatively to the screw-shaft which drives them through its rotation, and resilient means counterbalancing the centrifugal force acting on said counter-weight means; said sleeve being coaxial with the screw-shaft and having an axially projecting portion comprising a pair of cylindrical bearing surfaces of different diameters and limiting the counter-weights in their outwardly directed tendency, said bearing surfaces being connected together by a circular flange cooperating with said counter-weights in order to lock the sliding of the sleeve and therefore the pitch-change device as long as the screw R. P. M. exceeds a predetermined value.

In addition, our invention provides a screw specially adapted to light planes driven by a power-unit of about 100–200 H. P., wherein the blade orientation thereof is limited by bearings having a permissible variation of no more than 10° and being automatically locked within predetermined service limits of said power-unit. Nevertheless, such arrangement may be used on a screw adapted for power-units of any horse-power.

In a preferred embodiment of this invention, the connecting rods connecting the sleeve and each device secured to a blade root are made of assembled members thereby allowing the adjustment of the length thereof with respect to the distance between the axes of their links. More specifically, the adjustment of each device secured to a blade root relatively to said root may be so changed as to bring the axis of the link of the connecting rod on the blade root in a more or less rearward positional relationship with regard to the plane through the swivel axes of all blades and perpendicular to the axis of rotation of the screw.

As a general rule, the axis of the link secured to the blade root is in a plane containing the orientation axis for the blade and intersecting rearwardly a plane perpendicular to the screw axis of rotation at an angle of from about 0° to 60°. On the other hand, the connecting rod axis intersects the screw axis at an angle less than 90°.

The invention is characterized by these two last mentioned features, thereby affording a great flexibility in the blade orientation according to the power-unit R. P. M. and the instantaneous effective output of power. The resilient return torque towards the lower pitches remains substantially constant and is even reduced when the screw rotation speed increases if the aforementioned link axis secured to the blade root is in a sufficient rearward relationship with the plane containing the blade orientation axes and perpendicular to the screw rotation axis.

In other words, the rotation speed has a predominant effect on the blade orientation towards the higher pitches up to a maximum pitch which is a function of the power supplied by the power-unit, thereby allowing for a tendency of auto-regulation of the working-speed for a given power of the power-unit.

The aforesaid and other features and advantages of the invention will be now easily and fully understood from the illustration of one embodiment of an automatic screw pitch change and locking device according to the invention, it being understood that the invention is not restricted to the details of the illustrated and described embodiment.

In the accompanying drawings:

Fig. 2 is an enlarged axial sectional view of the front part of the screw hub showing the details of the automatic locking means.

Fig. 3 is a section along line III—III of Fig. 2 looking from left to right thereof.

Figure 1:
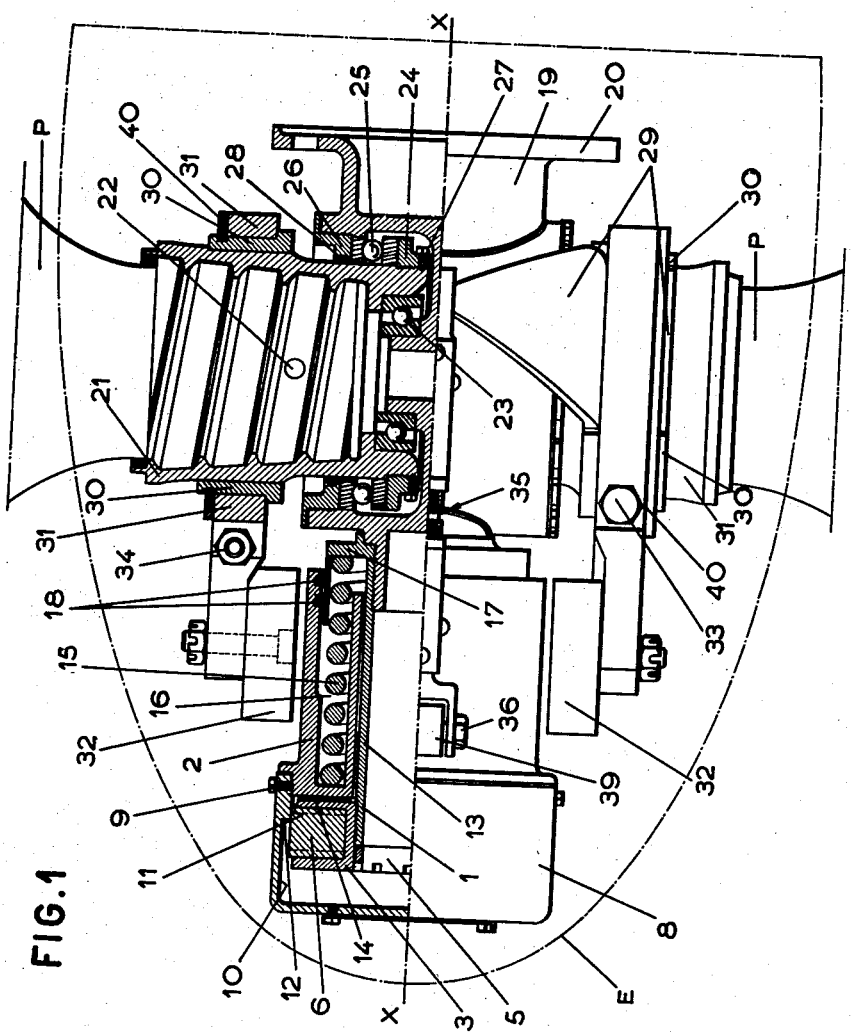
Fig. 1 is a fragmentary side elevational view of the screw with axial portions thereof in section.

The automatic pitch change and locking device, according to the invention, covered by a stream-lined nose casing E (shown in dashed and dotted lines in the drawing) comprises in cooperation with the screw hub 1 (hub tube) a sleeve 2 adapted to slide on a friction bush 13 fixedly secured on said hub 1; a nut 3 threadedly engaging the forward end of said hub 1 and provided with an annular recess 4; a pair of counter-weights 6, connected by two coil-springs 7, disposed in radial sliding contact in said annular recess; a lock-nut 5 (as in Fig. 1) or a spline 5a (as in Figs. 2 and 3) ensuring the locking of said nut 3 on said hub 1; a housing 8 screwed on said sleeve 2; and stop-screws 9 holding said housing 8 in the desired position on said hub 1. The housing 8 is provided with two inside annular bearings 10 and 11 connected by a circular flange 12. A set collar 14 limits the most forward thrust bearing position of the sleeve 2 with respect both to the hub 1 and the nut 3. The dotted lines on weights 6 in Figs. 2 and 3 indicate the presence of a slide recess in the nut 3 for guiding the weights 6.

When the screw is stationary, a spiral spring 15, disposed in a space 16 hollowed out in the sleeve 2, takes its bearing on a shoulder 17 of the hub 1 and pushes the sleeve 2 against its aforementioned forward thrust bearing thereby pressing the set collar 14 against the nut 3; reference numerals 18 illustrate synthetic rubber gaskets.

The hub barrel 19 made of special alloy steel comprises a coupling plate 20 co-operating with the coupling plate (not shown) disposed on the driving shaft. The plate 20 and the front end hub tube 1 are secured to the hub barrel 19 by arc welding.

The screw blades P are screwed, doweled, and cemented in the blade roots 21; reference numeral 22 illustrates a taper pin fixing the blades.

The blade root 21 is centered and implanted in the hub through a thrust ball bearing 23, an inside nut 24, a ball thrust bearing 25 and an outside bolt 26; reference numeral 27 illustrates a stop screw for the nut 24 and reference numeral 28 a rubber gasket. The bearing 25 is slightly pre-loaded by approximately 1000 pounds on assembling. The pair of bearings 23 and 25 can be replaced by a single bearing comprising two ball rows.

The blade root 21 is outwardly provided with a slight groove for two special steel crank-pins 29 comprising packing blocks 30. A tightening band 31, carrying a counter-weight 32, is tightly fitted around the crank pin 29 and block 30 thereof; a resilient clip ring 40 is fitted in a groove provided in the crank-pin 29 and the blocks 30; the band 31 is tightened by a bolt 33 and a nut 34. A connecting rod 35 of adjustable length, being provided intermediate its ends with means for increasing and decreasing its length, as shown, is linked around an axle 36 disposed in lugs 39, cast in one piece with the sleeve 2, and around an axle 37 formed by the threaded end of the crank-pin 29 on which is screwed a nut 38 maintaining the axle 37 in a hole provided in the connecting rod 35.

Figure 4:
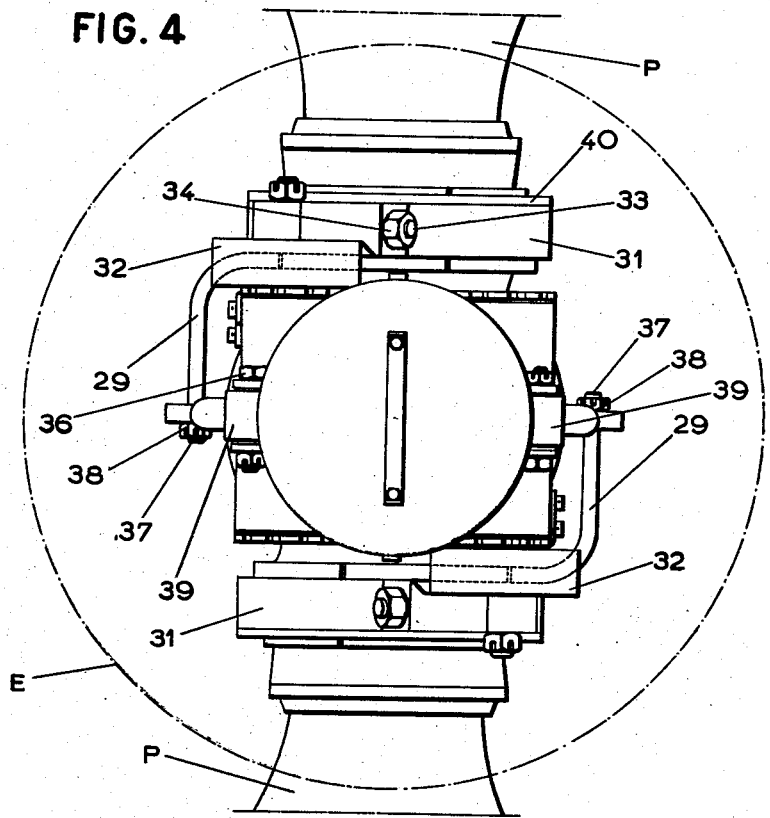
Fig. 4 is a fragmentary front elevational view of the screw perpendicular to its axis; and, Fig. 5 is a fragmentary view of the screw according to a plane parallel to its axis and perpendicular to the orientation axis for a blade.
Figure 5:
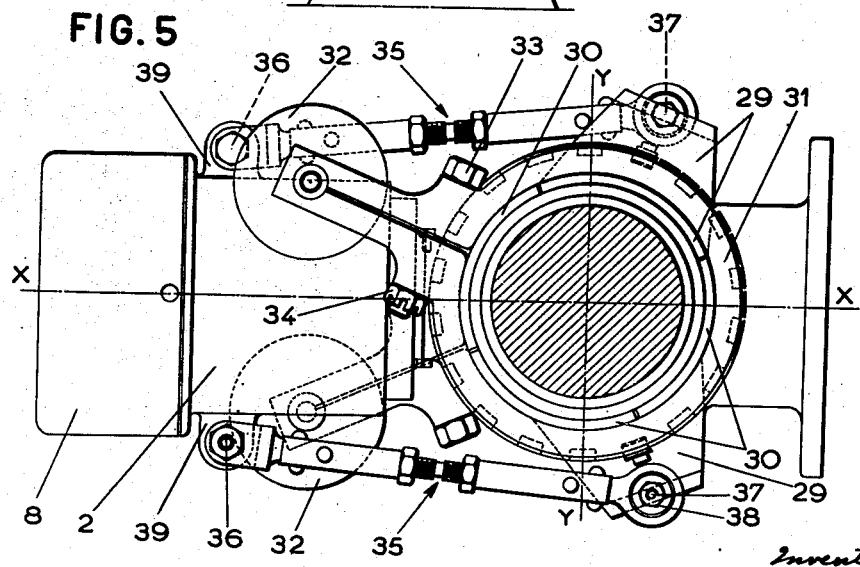

The connecting rod 35 is so disposed that its axis cuts the screw rotation axis forwardly and at an angle of less than 90°; in other words, the rear link 37 is further from the screw rotation axis than the front link 36 of said connecting rod 35. On the other hand, the link 37 is in a rearward relationship with the plane perpendicular to the screw rotation axis X—X, plane which contains the swivel axes of the blades and the trace of which in Fig. 4 is Y—Y. The angle between the plane, through the axis of link 37 and the corresponding blade swivel axis, and the plane perpendicular to the X—X axis containing the aforementioned swivel axis, is generally comprised between 0 and 60°. The links 36 and 37 may, of course, be provided with suitable bearings, e. g. ball or needle-bearings.

The automatic locking of the blades is realized as follows: as the speed of the plane increases, the sleeve 2 and the housing 8 move back under the action of the pitch regulating device. The counter-weights 6 disposed in the annular recess 4 of the nut 3 are held in said recess by the tension of the spiral coils 7, the equilibrium between the strength of said springs and the centrifugal force acting on said counter-weights 6 being reached for a certian R. P. M. (called $N_1$) of the power-unit. If No is the constant R. P. M. regulated by the pitch regulating device and Nc the cruising R. P. M.

$$N_1 < Nc < No$$

When the plane approaches its maximum speed for No R. P. M., the counter-weights 6, during the backing of sleeve 2 and the housing 8 thereof, are no longer restricted in their outward tendency by the bearing 11 and, as the centrifugal force acting on them is superior to the resilient force of the spring 7, said counter-weights bear on the surface 10. If the motor admission pressure is reduced, the rear faces of the counter-weights 6 bear on the ring surface 12 which prevents the advancing of the sleeve 2 and the associated housing 8, thereby immobilizing the blades in the hub. If the admission pressure and therefore the power-unit R. P. M. is still further reduced, the resilient force of the springs 7 becomes, for a given value of the R. P. M., preponderant and the counter-weights 6 are brought back in the annular recess 4, then the sleeve 2 and the associated housing 8 slide freely, thereby unlocking the pitch regulating device which works as follows:

When the screw rotates, the distance from the counter-weights 32 to the rotation axis X—X tends to increase and said counter-weights cause the band 31 carrying them to rotate the crank-pin 29 and the blocks 30 and the screw blade to swivel. The axis of the link 37 is therefore brought rearwardly and the connecting rod 35 through its link 36 causes the sliding of the sleeve 2 thereby compressing the coil spring 15 which tends consequently to prevent this sliding. But it must be noted that the swivel torque, provided by the compression of said coil spring 15 and acting on the blade root, may remain substantially constant or even diminish for the higher pitches because, on account of the position of the axis of link 37, the lever arm of the force, transmitted through the connecting rod 35, which determines the return torque towards the lower pitches, diminishes when its blade pitch increases; in practice, a maximum variation of the blade pitch for a blade swivelling of about 10° is sufficient. The substantial constancy of the return torque of the screw towards the lower pitches ensures a preponderant action in the blade orientation to the counter-weights under the R. P. M. of the power unit, thereby providing a fast adaptation of the screw pitch to the power-unit R. P. M.

The invention is not restricted to the specific illustrated embodiment, but is subject to modifications and adaptations, which will occur to those skilled in the art, e. g. the automatic blocking means described could be actuated by the relative speed of the air or the variation of the motor torque instead of being driven by the rotation of the screw-shaft as in the illustrated preferred embodiment; and it should be understood that protection is sought for the invention as covered by the spirit and the language of the attached claims.

Having thus described the invention, what we claim is:

1. A variable pitch propeller having a hub, blades swivelly connected thereto permitting rotation about a geometrical axis perpendicular to the axis of said hub, a weighted member for each of said blades, means for securing said weighted members on each of said blades in such a manner that the centrifugal action of said weighted members urges the blades to increase the pitch, a slide-block coaxial with and slidingly associated for relative axial movement with said hub, mechanical connecting means between said slide-block and each of said blades for urging said slide-block rearwardly when the pitch increases, yielding means associated with said hub and slide-block for resisting the rearward movement of said slide-block, locking means for said slide-block comprising at least a weight associated for radial movement with one of the two members of the group consisting of said hub and said slide-block, stopping means for said weight, secured to the other member of said group and having a forward cylindrical surface parallel to the axis of said hub, a rear cylindrical surface parallel to said forward surface and at a shorter distance of said axis, a substantially radial surface joining the said forward and rear surfaces; spring means engaging said weight for urging said weight towards said axis, whereby said substantially radial surface stops said weight and consequently the rear movement of said slide-block when the speed of the propeller varies from a predetermined upper speed within a range of speeds comprised between said upper speed and a lower one, so that in this case the pitch of the propeller remains unvarying but varies freely in all other cases within said range of speeds as out of said range.

2. A variable pitch propeller having a hub, blades swivelly connected thereto permitting rotation about a geometrical axis perpendicular to the axis of said hub, a weighted member for each of said blades, means for securing said weighted members on each of said blades in such a manner that the centrifugal action of said weighted members urges the blades to increase the pitch, a sleeve coaxial with said hub and slidingly associated therewith for axial movement thereon, a linked rod for each of said blades, articulated at its ends with said sleeve and to said respective blades by means of pins disposed parallel to said perpendicular geometrical axis, and adapted to urge said sleeve rearwardly when the pitch increases, spring means associated with said hub and sleeve for resisting the rearward movement of said sleeve, locking means for said sleeve comprising at least a weight mounted on said hub for relative radial movement with respect thereto, stopping means for said weight, secured to said sleeve and having a forward cylindrical surface parallel to the axis of said hub, a rear cylindrical surface parallel to said forward surface and at a shorter distance of said axis, a substantially radial surface joining the said forward and rear surfaces; spring means engaging said weight for urging said weight towards said axis, whereby said substantially radial surface stops said weight and consequently the rearward movement of said sleeve when the speed of the propeller varies between a predetermined upper speed and a lower one, so that in this case the pitch of the propeller remains unvarying but varies freely in all other cases within said range of speeds as out of said range.

3. A variable pitch propeller as claimed in claim 2 wherein said linked rods cut the propeller axis in front at an angle less than 90°.

4. A variable pitch propeller as claimed in claim 2 wherein the axis of the pin articulating each of said rods with each of said blades is in a rearward relationship with the plane through the axes of the swivel joint of said blades.

5. A variable pitch propeller as claimed in claim 2 in which the length of said linked rods can be increased and decreased by adjusting means provided intermediate their ends.

6. A variable pitch propeller as claimed in claim 2, wherein the respective planes defined by the axis of each of said pins articulating said rods with said respective blades, and the geometrical axis of said blades, cuts the plane generated by said axes of the blades when said propeller is rotated at an angle between 0° and 60°.

MAXIME DE LAGREVOL.
ROGER LABOUREIX.

References Cited in the file of this patent

UNITED STATES PATENTS

| Number | Name | Date |
|---|---|---|
| 1,328,241 | Weaver | Jan. 13, 1920 |
| 1,728,315 | Viale et al. | Sept. 17, 1929 |
| 2,177,315 | De Caria | Oct. 24, 1939 |
| 2,282,297 | Keller | May 5, 1942 |
| 2,533,321 | King | Dec. 12, 1950 |